(12) United States Patent
Hargreaves et al.

(10) Patent No.: US 10,126,874 B2
(45) Date of Patent: Nov. 13, 2018

(54) ACTIVE PEN PANEL RECEIVER INTERFERENCE CANCELLATION (71) Applicant: Synaptics Incorporated, San Jose, CA (US)

(72) Inventors: Kirk Hargreaves, Sunnyvale, CA (US); Sanjay Mani, Los Altos Hills, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/346,715

(22) Filed: Nov. 8, 2016

(65) Prior Publication Data

US 2018/0129346 A1 May 10, 2018

(51) Int. Cl.
G06F 3/041 (2006.01)
G06F 3/0354 (2013.01)
G06F 3/038 (2013.01)
G06F 3/044 (2006.01)

(52) U.S. Cl.
CPC ............ *G06F 3/0418* (2013.01); *G06F 3/038* (2013.01); *G06F 3/03545* (2013.01); *G06F 3/044* (2013.01)

(58) Field of Classification Search
CPC .... G06F 3/0418; G06F 3/044; G06F 3/03545; G06F 3/038
See application file for complete search history.

(56) References Cited

U.S. PATENT DOCUMENTS

| | | | |
|---|---|---|---|
| 8,278,571 B2 | 10/2012 | Orsley | |
| 8,493,359 B2 | 7/2013 | Wright et al. | |
| 8,648,830 B2 | 2/2014 | Perski et al. | |
| 8,847,899 B2 | 9/2014 | Washburn et al. | |
| 8,928,635 B2 | 1/2015 | Harley et al. | |
| 8,952,916 B2 | 2/2015 | Reynolds | |
| 9,024,810 B2 | 5/2015 | Lohbihler | |
| 9,024,884 B2 | 5/2015 | Lengeling et al. | |
| 9,063,608 B2 | 6/2015 | Roberson et al. | |
| 9,081,453 B2 | 7/2015 | Bulea et al. | |
| 9,164,604 B2 | 10/2015 | Pant et al. | |
| 2004/0056849 A1 | 3/2004 | Lohbihler et al. | |
| 2009/0153152 A1 | 6/2009 | Maharyta et al. | |
| 2011/0084857 A1 | 4/2011 | Marino et al. | |
| 2011/0147101 A1* | 6/2011 | Bateman | G06F 3/0416 178/18.06 |
| 2011/0210940 A1* | 9/2011 | Reynolds | G06F 3/0418 345/174 |
| 2011/0254802 A1 | 10/2011 | Philipp | |
| 2012/0050207 A1 | 3/2012 | Westhues et al. | |
| 2012/0105362 A1 | 5/2012 | Kremin et al. | |
| 2014/0160056 A1* | 6/2014 | Mahalingam | G06F 3/044 345/174 |
| 2014/0184554 A1* | 7/2014 | Walley | G06F 3/0416 345/174 |

* cited by examiner

*Primary Examiner* — Liliana Cerullo
(74) *Attorney, Agent, or Firm* — Ferguson Braswell Fraser Kubasta PC (57) ABSTRACT A processing system for reducing interference. The processing system includes: a sensor module configured to: receive a noisy active pen signal associated with an active pen from a panel receiver; and receive a plurality of interference signals from a plurality of interference receivers; and a determination module configured to: determine an estimated interference signal based on a subset of the plurality of interference signals; and generate a filtered active pen signal by reducing interference in the noisy active pen signal based on the estimated interference signal.

20 Claims, 7 Drawing Sheets

ACTIVE PEN PANEL RECEIVER INTERFERENCE CANCELLATION

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may be used to detect finger, styli, or pens.

SUMMARY

In general, embodiments relate to a processing system for reducing interference. The processing system comprises: a sensor module configured to: receive a noisy active pen signal (i.e., an active pen signal with one or more types of interference) associated with an active pen from a panel receiver; and receive a plurality of interference signals from a plurality of interference receivers; and a determination module configured to: determine an estimated interference signal based on a subset of the plurality of interference signals; and generate a filtered active pen signal by reducing interference in the noisy active pen signal based on the estimated interference signal.

In general, embodiments relate to a method for reducing interference. The method comprises: receiving a noisy active pen signal (i.e., an active pen signal with one or more types of interference) associated with an active pen from a panel receiver; receiving a plurality of interference signals from a plurality of interference receivers; determining an estimated interference signal based on a subset of the plurality of interference signals; and generating a filtered active pen signal by reducing interference in the noisy active pen signal based on the estimated interference signal.

In general, embodiments relate to an input device. The input device comprises: a panel receiver; a plurality of interference receivers; and a processing system configured to: receive a noisy active pen signal (i.e., an active pen signal with one or more types of interference) associated with an active pen from the panel receiver; receive a plurality of interference signals from the plurality of interference receivers; determine an estimated interference signal based on a subset of the plurality of interference signals; and generate a filtered active pen signal by reducing interference in the noisy active pen signal based on the estimated interference signal.

Other aspects of the embodiments will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
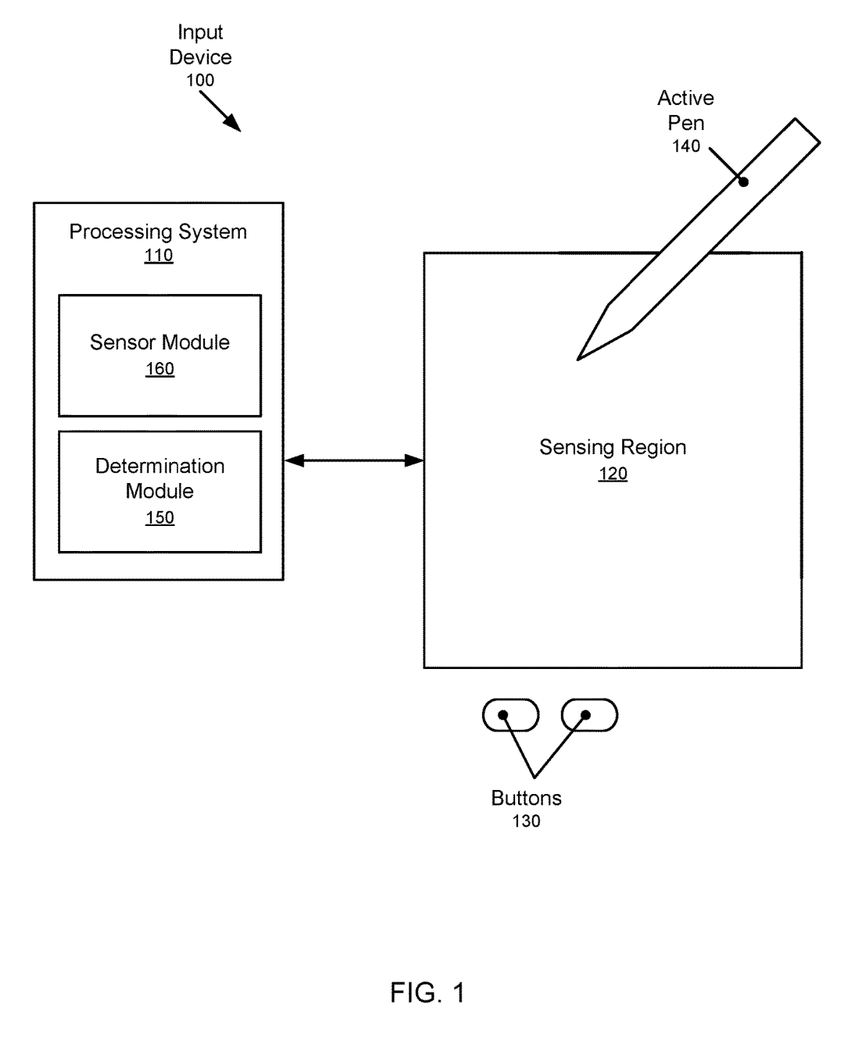
FIG. 1 and FIG. 2 show block diagrams of an input device in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module (150) may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects in a sensing region (120). Example input objects include styli, an active pen (140), and fingers. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (e.g., active pen (140))). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen (155) may share physical elements. For example, some embodiments may utilize some of the same electrical components for displaying and sensing. In various embodiments, one or more display electrodes of a display device may configured for both display updating and input sensing. As another example, the display screen (155) may be operated in part or in total by the processing system (110).

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

As shown in FIG. 1, an active pen (140) may be present in the sensing region (120). The one or more actions taken by the processing system (110) and/or the electronic system (not shown) connected to the input device (100) may depend on where the active pen (140) is located. Accordingly, quickly determining the position of the active pen (140) (e.g., by capacitance sensing) is important.

In one or more embodiments, data is wirelessly transmitted by the active pen (140) to the processing system (110). This transmitted data may specify one or more attributes of the active pen (140). For example, the data may specify a measured pressure or force at the tip of the active pen (140). As another example, the data may specify the button status (e.g., pressed, not pressed, etc.) of each button of the active pen (140). As another example, the data may specify the tilt of the pen and/or the acceleration of the pen. As yet another example, the data may specify a mode (e.g., erasure mode) in which the active pen (140) is operating.

In one or more embodiments, the active pen (140) transmits its data by modulating (e.g., using on-off keying (OOK), binary phase-shift keying (BPSK), etc.) a carrier signal with the data. Other modulation and spread spectrum techniques may also be used. The active pen signal (i.e., modulated carrier signal) may be received by a panel receiver (not shown) connected to the sensor module (160) and processed (e.g., demodulated, digitized, filtered, etc.) by the determination module (150). Additionally or alternatively, some or all of the processing may be executed by the sensor module (160).

Those skilled in the art, having the benefit of this detailed description, will appreciate that interference may be present near or around the input device (100) during the transmission of the active pen signal. Specifically, there may be one or more types of interference generated by one or more sources (e.g., power supply, display screen, etc.). Accordingly, the panel receiver (not shown) effectively receives a combination of any interference that is present and the active pen signal. It is this noisy active pen signal (i.e., active pen signal with one or more types of interference) that is processed by the processing system (110).

Figure 2:
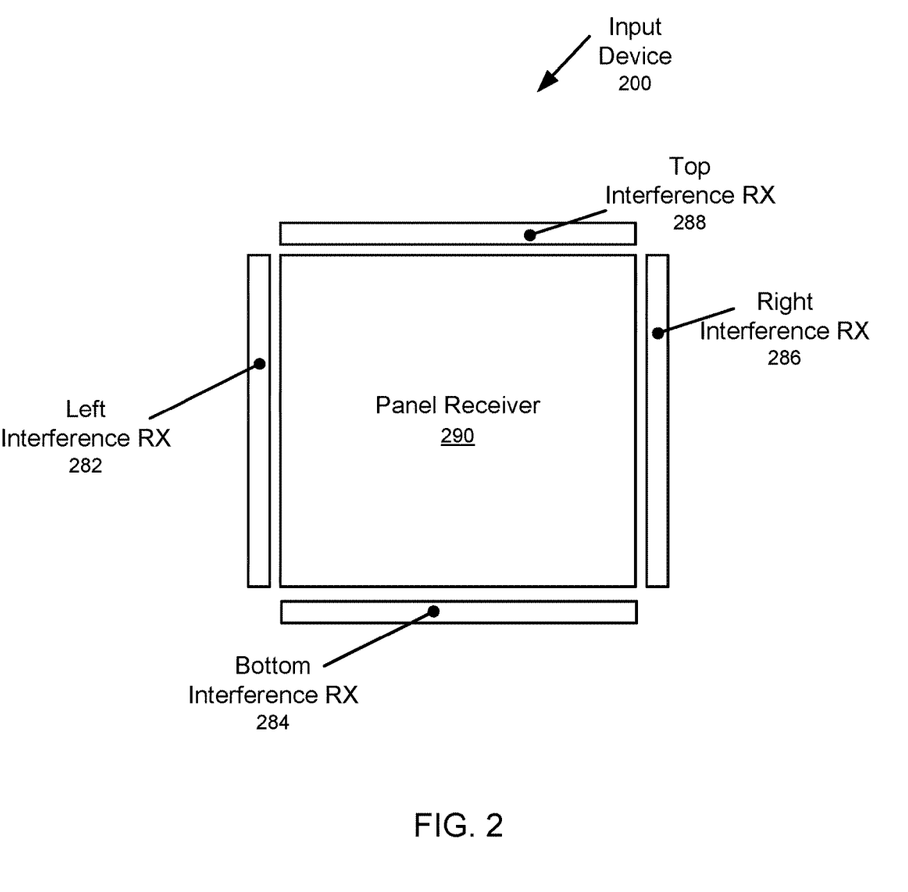

FIG. 2 shows an input device (200) in accordance with one or more embodiments. As shown in FIG. 2, the input device (200) includes a panel receiver (290) and one or more interference receivers (i.e., top interference receiver (288), right interference receiver (286), bottom interference receiver (284), and left interference receiver (282)). The panel receiver (290) and the multiple interference receivers (282, 284, 286, 288) may be connected to the processing system (110), discussed above in reference to FIG. 1. As shown in FIG. 2, the interference receivers (282, 284, 286, 288) may be located on or near the perimeter of the panel receiver (290). In one or more embodiments, there is one interference receiver located on each side of the panel receiver. In one or more embodiments of the invention, there are multiple interference receivers located on a single side of the panel receiver (290). Moreover, although the panel receiver (290) is shown as being rectangular in FIG. 2, the perimeter of the panel receiver (290) may be of any shape.

As discussed above, the panel receiver (290) receives the noisy active pen signal, which is the combination of the active pen signal from the active pen (140) and interference from one or more sources (e.g., power supply, display screen, etc.). Like the panel receiver (290), the interference receivers (282, 284, 286, 288) also receive a combination of the active pen signal and the interference. However, the strength of the active pen signal received by an interference receiver varies based on the distance between the interference receiver and the location of the active pen (140). In other words, some of the interference receivers are effectively measuring the interference without measuring the active pen signal. The strength of the received interference may also vary between the interference receivers (282, 284, 286, 288).

For example, if the active pen (140) is close to the right interference receiver (286), the right interference receiver (286) will receive both the active pen signal and the interference. In contrast, the left interference receiver (282) will receive the interference, but little to no of the active pen signal because of its distance from the active pen (140). As another example, if the active pen is near the bottom left corner of the panel receiver (290), the left interference receiver (282) and the bottom interference receiver (284) will receive both the active pen signal and the interference. In contrast, the top interference receiver (288) and the right interference receiver (286) will receive the interference, but little to no of the active pen signal because of their distance from the active pen (140).

Those skilled in the art, having the benefit of this detailed description, will appreciate that by using the subset (i.e., one, multiple, all) of the interference receivers (282, 284, 286, 288) that are only, or at least primarily, measuring the interference, the interference in the noisy active pen signal may be estimated (discussed below). Moreover, this estimated interference signal may be used to filter (i.e., mitigate, reduce, etc.) the interference in the noisy active pen signal received by the panel receiver (290) (discussed below).

Figure 3A:
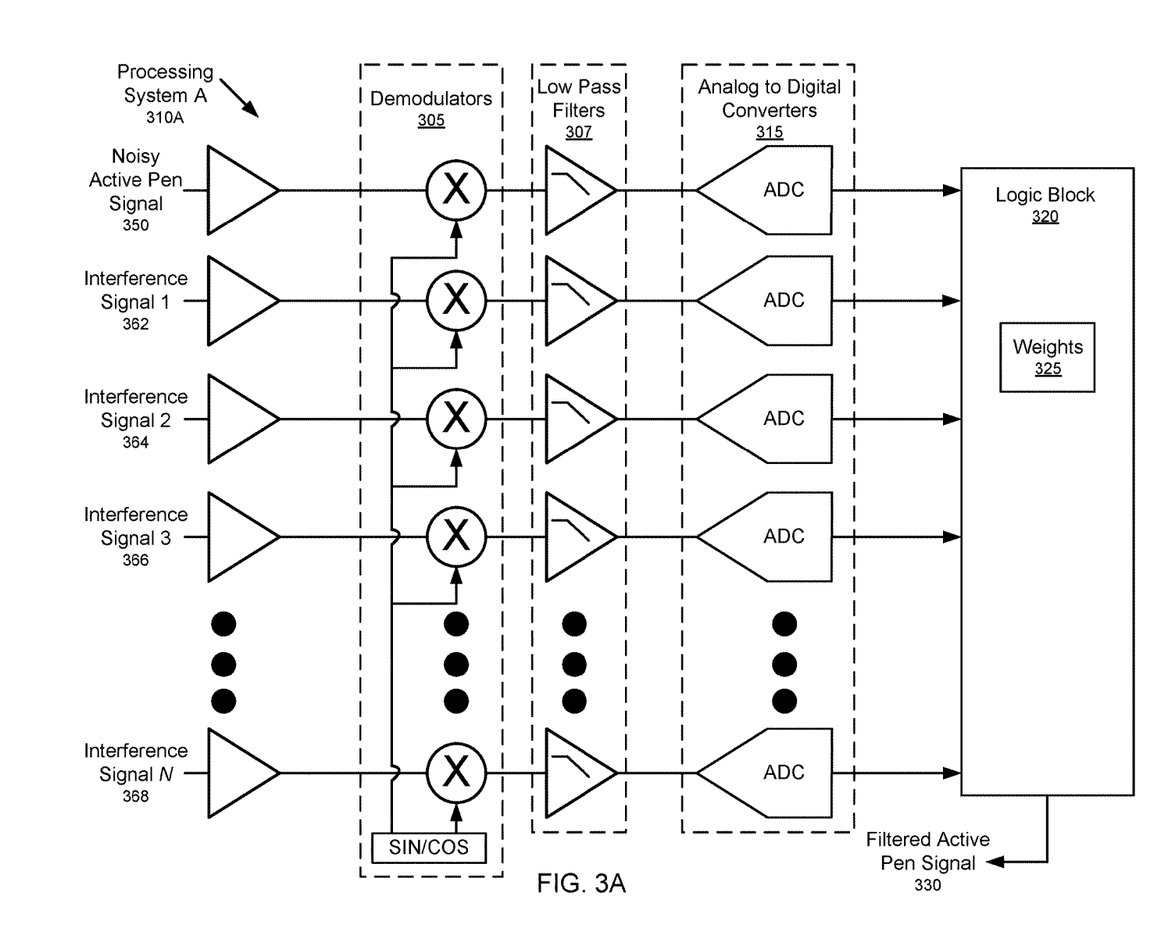
FIG. 3A-FIG. 3D show block diagrams of processing systems in accordance with one or more embodiments.

FIG. 3A shows the processing system A (310A) in accordance with one or more embodiments. Processing system A (310A) may correspond to the processing system (110), discussed above in reference to FIG. 1. The elements shown in FIG. 3A may be located in the sensor module (160), the determination module (150), and/or split between both the sensor module (160) and the determination module (150).

As shown in FIG. 3A, processing system A (310A) inputs the noisy active pen signal (350) from the panel receiver and multiple interference signals (i.e., Interference Signal 1 (362), Interference Signal 2 (364), Interference Signal 3 (366), Interference Signal N (368)) from multiple interference receivers. As discussed above, the noisy active pen signal (350) includes the received active pen signal and interference from one or more sources. Also, each interference signal (362, 364, 366, 368) may include an active pen signal component and an interference component received by an interference receiver. However, as discussed above, the strength of the active pen signal component varies between interference receivers. Accordingly, interference signal 1 (362) may include a relatively strong active pen signal component, for example, while interference signal 3 (366) may include a relatively small or even non-existent active pen signal component. As also discussed above, the strength of the interference component may vary between interference signals (362, 364, 366, 368).

Still referring to FIG. 3A, processing system A (310A) has multiple elements including multiple demodulators (305), multiple low pass filters (307), and multiple analog-to-digital converters (ADCs) (315). Further, processing system A (310A) includes multiple receiver channels: one receiver channel for the noisy active pen signal (350) and one receiver channel for each of the interference signals (362, 364, 366, 368). Each receiver channel includes one of the demodulators (305), one of the low-pass filters (307), and one of the ADCs (315) to process the noisy active pen signal (350) or one of the interference signals (362, 364, 366, 368).

In one or more embodiments, processing system A (310A) includes the logic block (320). The logic block (320) may be implemented in hardware (i.e., circuitry), software, firmware, or any combination thereof. Those skilled in the art, having the benefits of this detailed description, will appreciate that with the layout in FIG. 3A, the noisy active pen signal (350) and the interference signals (362, 364, 366, 368) are demodulated, then filtered, and then digitized before being inputted to the logic block (320).

As shown in FIG. 3A, the logic block includes multiple weights (325). There may be one weight for each interference signal (362, 364, 366, 368). Moreover, for a selected interference signal, the weight may be calculated based on the distance between the location of the active pen (e.g., as determined from capacitance sensing) and the interference receiver that received the selected interference signal. In other words, the weight may be a function of distance. For example, the weight may be proportional to the distance. In one or more embodiments of the invention, one or more of the weights (325) may be set zero. For example, interference signals from interference receivers that are close to the active pen location, and thus have strong active pen signal components, may be assigned small weights or even no weight.

In one or more embodiments, the logic block (320) is configured to generate (e.g., determine, calculate, etc.) an estimated interference signal based on the noisy active pen signal (350), a subset (i.e., one, multiple, or all) of the interference signals (362, 364, 366, 368), and the weights (325). For example, the estimated interference signal may be a weighted average of the interference signals (362, 364, 366, 368). Interference signals with a small active pen signal component, and thus primarily being interference, should play a prominent role is determining the estimated interference signal.

In one or more embodiments, the logic block (320) is also configured to generate a filtered active pen signal (330). The filtered active pen signal (330) may be generated by using the estimated interference signal to filter (i.e., mitigate, reduce, etc.) the interference in the processed (i.e., demodulated, filtered, digitized, etc.) noisy active pen signal. For example, the estimated interference signal may be subtracted from the processed noisy active pen signal (350), effectively removing, or at least reducing, the interference from the noisy active pen signal. Additional processing may be performed on the filtered active pen signal (330). For example, the filtered active pen signal (330) may be parsed to determine one or more attributes of the active pen that were transmitted by the active pen. Different attributes and/or different values of an attribute may trigger different responses by the input device (100).

Figure 3B:
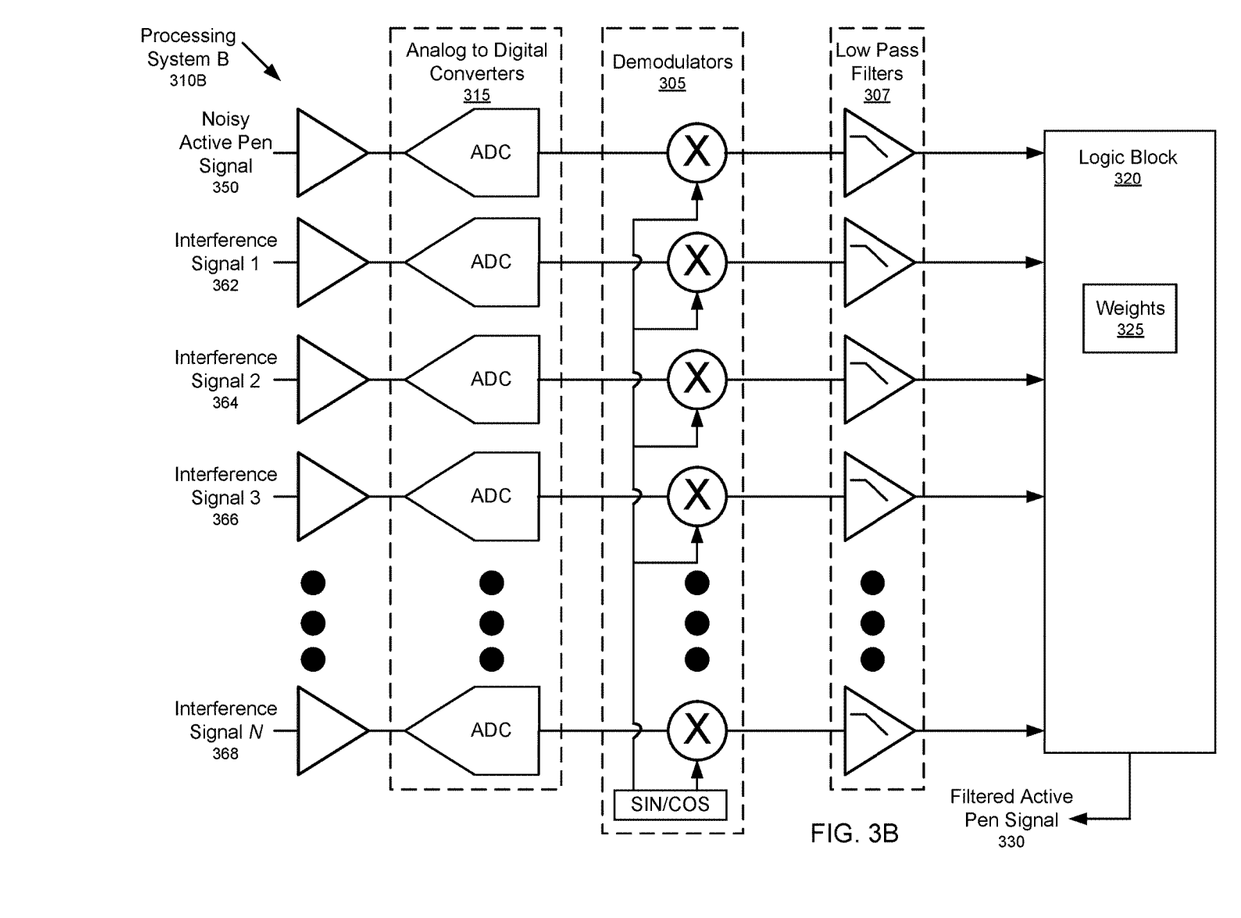

FIG. 3B shows the processing system B (310B) in accordance with one or more embodiments. Processing system B (310B) is similar to processing system A (310A), discussed above in reference to FIG. 3A. However, in processing system B (310B), the ADCs (315) are placed before the demodulators (305) in the receiver channels. In other words, the noisy active pen signal (350) and the interference signals (362, 364, 366, 368) are digitized and then digital demodulation and digital filtering are executed. Those skilled in the art, having the benefit of this detailed description, will appreciate that the ADCs (305) in FIG. 3B must operate at high speeds for the layout of FIG. 3B to be operational.

Figure 3C:
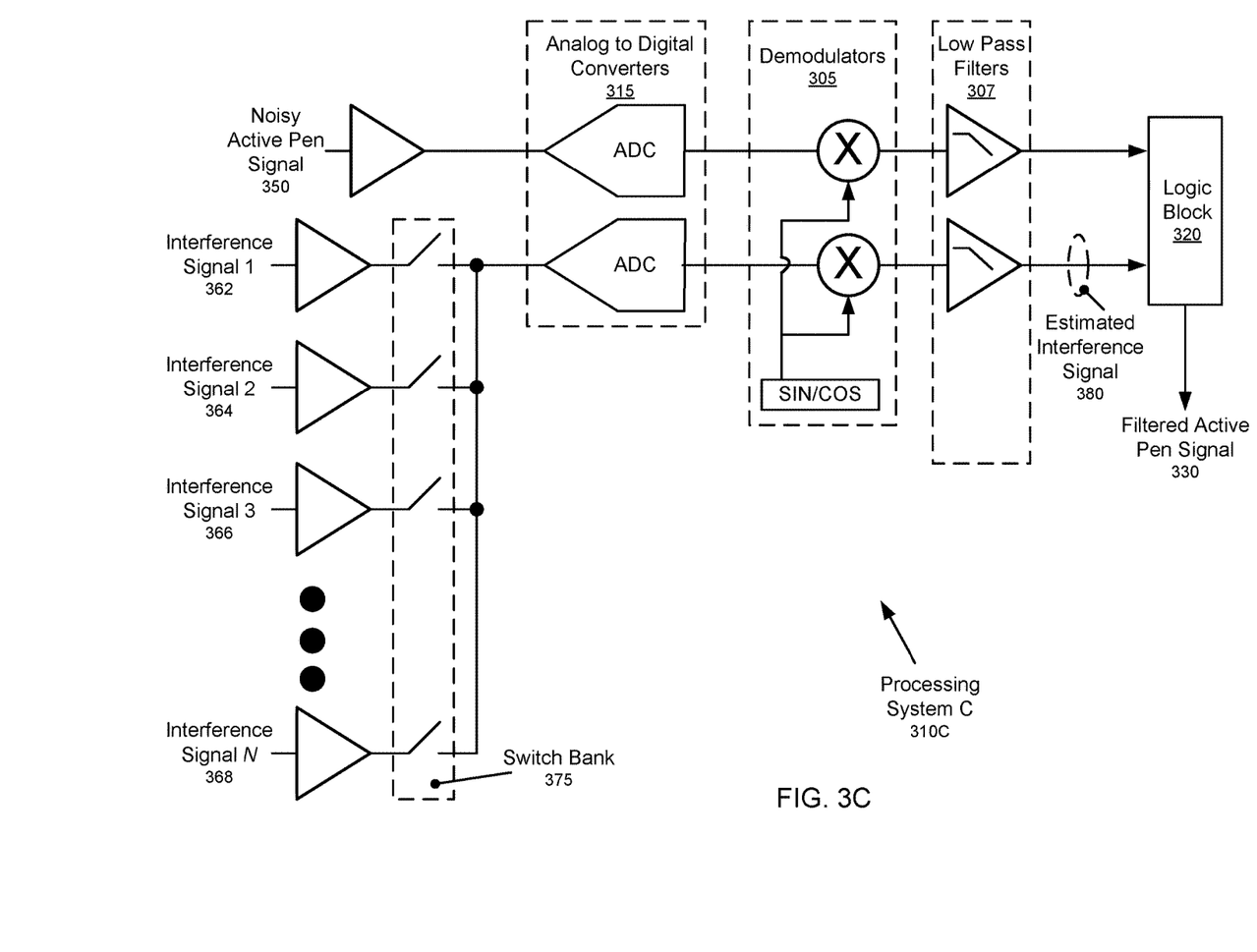

FIG. 3C shows processing system C (310C) in accordance with one or more embodiments. In processing system C (310C), there are only two receiver channels: one receiver channel for the noisy active pen signal (350) and one receiver channel for the subset (i.e., one, multiple, all) of the interference signals (362, 364, 366, 368). Processing system C (310C) also includes a switch bank (375) that selects the subset (i.e., one, multiple, or all) of the interference signals (362, 364, 366, 368) that will be used to calculate the estimated interference signal (380). For example, the switch bank (375) might only select interference signals received by interference receivers located at least a predetermined distance from the active pen. The output of the switch bank (375) may be a summing junction. Those skilled in the art, having the benefit of this detailed description, will appreciate that in some embodiments, the switch bank (375) might only select one of the interference signals. In such embodiments, the switch bank (375) operates as a multiplexer.

Similar to processing system A (310A) and processing system B (310B), processing system C (310C) includes the logic block (320). The logic block (320) generates the filtered active pen signal (330) based on the processed noisy active pen signal (350) and the estimated interference signal (380). Specifically, the logic block (320) may use the estimated interference signal (380) to filter (i.e., mitigate, reduce, etc.) the interference in the processed noisy active pen signal.

Figure 3D:
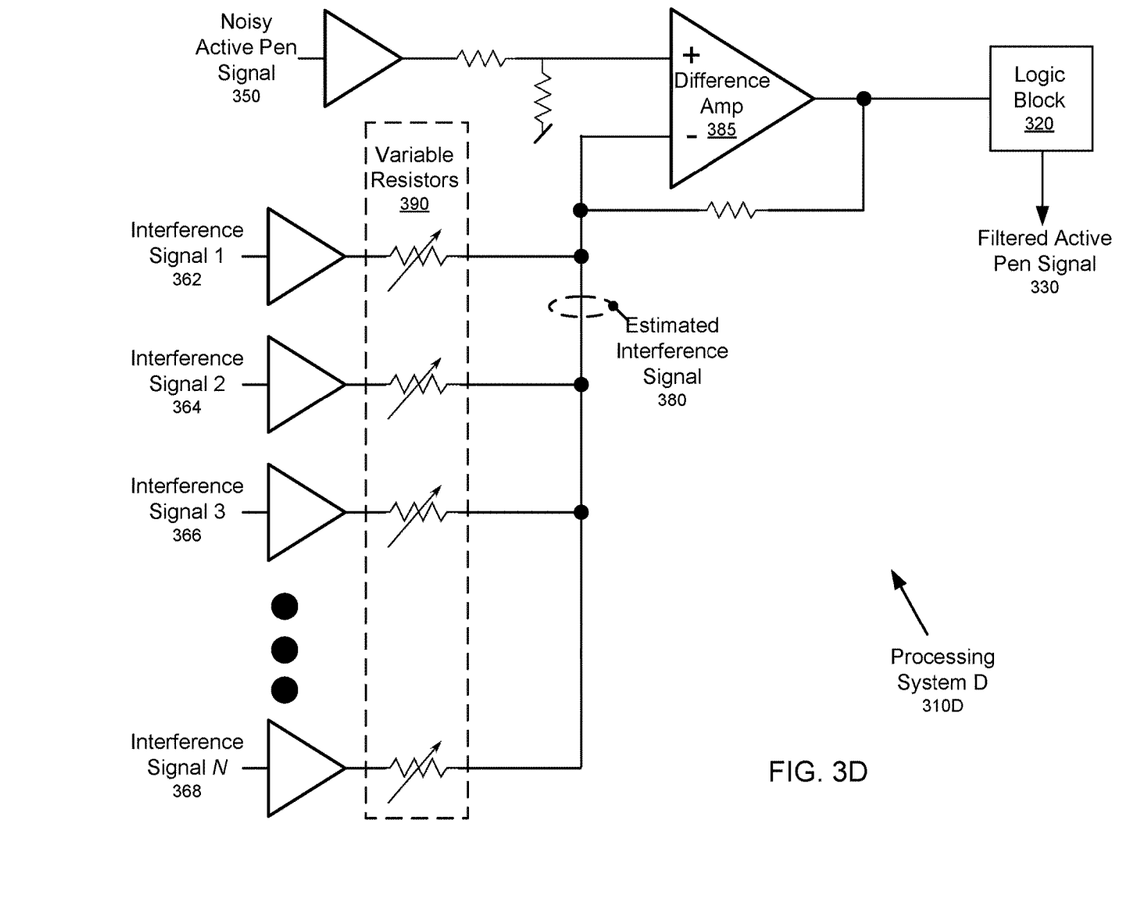

FIG. 3D shows the processing system D (310D) in accordance with one or more embodiments. Processing system D (310D) may correspond to the processing system (110), discussed above in reference to FIG. 1. As shown in FIG. 3D, processing system D (310D) has a single receiver channel. The single receiver channel has a difference amplifier (385) with one input coupled to the noisy active pen signal (350) and one input coupled to the subset of interference signals (362, 364, 366, 368). Specifically, a set of variable resistors (390) couple the subset of interference signals (362, 364, 366, 368) to the difference amplifier (385).

Those of ordinary skill in the art, having the benefit of this detailed description, will appreciate that the set of variable resistors (390) may be used to apply different weights to different interference signals (362, 364, 366, 368). For example, little weight may be applied to interference signals received from interference receivers close to the active pen. In contrast, more weight may be applied to interference signals received by interference receivers further away from the location of the active pen. These variable resistors (390) are used to generate an estimated interference signal (380) from the interference signals (362, 364, 366, 368). Moreover, the difference amplifier (385) may be used to filter the interference from the noisy active pen signal (350) using the estimated interference signal (380). The logic block (320) may perform additional processing (e.g., digitizing, demodulating, filtering, etc.) on the output of the difference amplifier to generate the filtered active pen signal (330). The filtered active pen signal (330) may be parsed to determine one or more attributes of the active pen that were transmitted by the active pen. Different attributes and/or different values of an attribute may trigger different responses by the input device (100).

Figure 4:
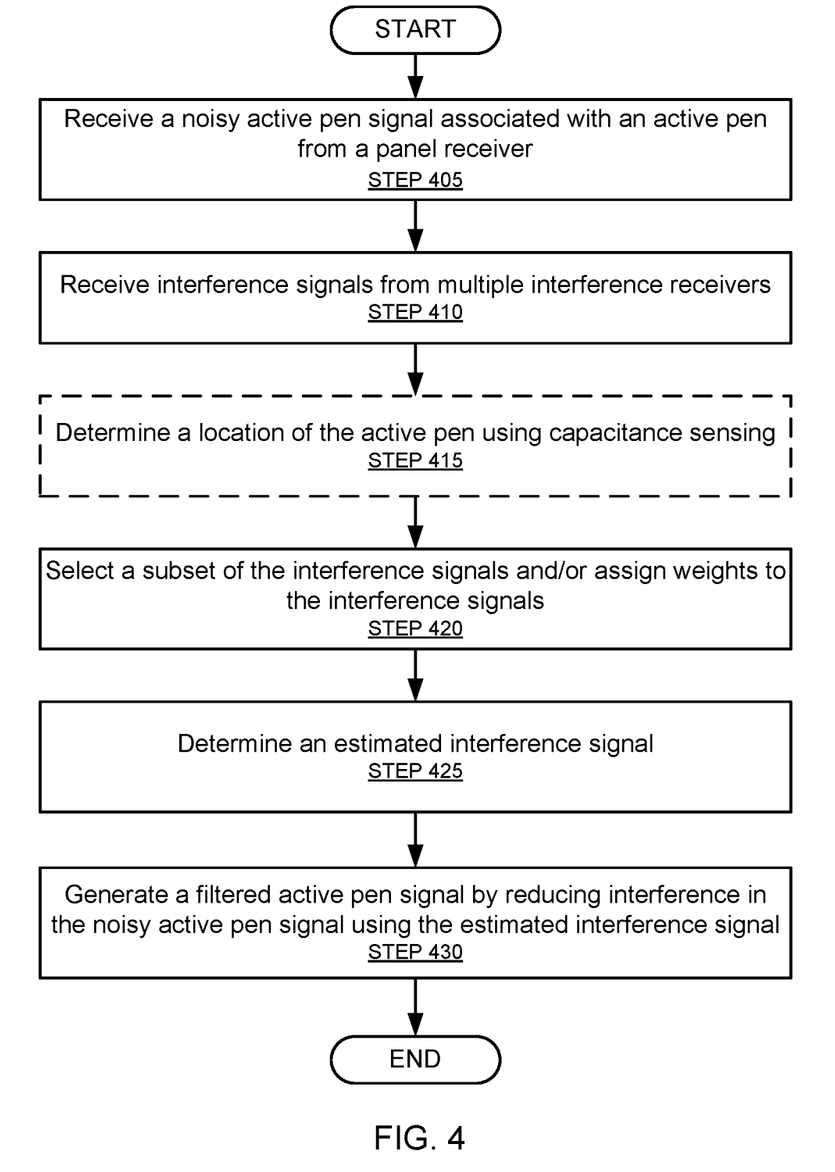
FIG. 4 shows a flowchart in accordance with one or more embodiments.

FIG. 4 shows a flowchart in accordance with one or more embodiments. The flowchart of FIG. 4 depicts a method for reducing interference in an input device like input device (100) and/or input device (200). One or more of the steps in FIG. 4 may be performed by the components of the input system (200) or input system (100), discussed above in reference to FIG. 2 and FIG. 1, respectively. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a noisy active pen signal is received by a panel receiver (STEP 405). The noisy active pen signal includes the active pen signal transmitted by an active pen within a sensing region of the input device, and interference from one or more sources. The content of the active pen signal may include the current attributes of the active pen.

In STEP 410, interference signals are received by multiple interference receivers. The interference receivers may be located along the perimeter of the panel receiver. Each interference signal may include both an active pen signal component and an interference component. The strength of both the active pen signal component and the interference component may vary between interference signals. For example, the interference signal received by an interference receiver close to the active pen will have a stronger active pen signal component than the interference signal received by an interference receiver further away from the active pen.

In STEP 415, a location of the active pen within the sensing region is determined. The location of the active pen may be determined using capacitance sensing. As the interference receivers are fixed in place, the distance between each interference receiver and the location of the active pen may also be calculated.

In STEP 420, a subset of the interference signals are selected and/or assigned weights. For example, an interference signal received by an interference receiver located far away from the active pen may be selected and given significant weight. In contrast, an interference signal received by an interference receiver located close to the active pen might not even be selected, or if it is selected, it is assigned little weight. Weight may be a function of the distance between the interference receiver and the active pen. As discussed above, in some embodiments, the subset of interference signals may be selected using a switch bank and/or weights may be assigned using variable resistors. In some embodiments, weight may be assigned without consideration of the active pen location relative to the interference receiver locations. Rather, the weights may be selected mathematically which best minimize interference. In such embodiments, STEP 415 may be optional.

In STEP 425, an estimated interference signal is determined. The estimated interference signal may be a weighted average of the selected subset of interference signals. The estimated interference signal may be calculated digitally or using analog circuits.

In STEP 430, a filtered active pen signal is generated by filtering the interference in the noisy active pen signal based on the estimated interference signal. For example, the estimated interference signal may be subtracted from the noisy active pen signal (e.g., digitally or using analog circuit elements such as a difference amplifier). The filtered active pen signal may be parsed to determine the attributes of the active pen that were transmitted by the active pen.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for reducing interference, comprising:
a sensor module configured to:
receive a noisy active pen signal associated with an active pen from a panel receiver; and
receive a plurality of interference signals from a plurality of interference receivers; and
a determination module configured to:
determine a location of the active pen;
calculate a plurality of distances between the location and the plurality of interference receivers;
select, based on the plurality of distances, a subset of the plurality of interference signals from a subset of the plurality of interference receivers,
wherein the subset of the plurality of interference receivers are separated from the location by a subset of the plurality of distances;
determine an estimated interference signal based on the subset of the plurality of interference signals; and
generate a filtered active pen signal by reducing interference in the noisy active pen signal based on the estimated interference signal.

2. The processing system of claim 1, wherein the plurality of interference receivers are located along a perimeter of the panel receiver, and wherein the filtered active pen signal is generated by subtracting the estimated interference signal from the noisy active pen signal.

3. The processing system of claim 1, wherein the determination module is further configured to:
apply a plurality of weights to the subset of the plurality of interference signals based on the subset of the plurality of distances,
wherein the estimated interference signal is further determined based on the plurality of weights.

4. The processing system of claim 3, wherein the plurality of weights are proportional to the subset of the plurality of distances, and wherein the location of the active pen is determined using capacitive sensing.

5. The processing system of claim 1, wherein the determination module is further configured to:
select a plurality of weights that mathematically minimize the interference; and
apply the plurality of weights to the plurality of interference signals,
wherein the estimated interference signal is further determined based on the plurality of weights.

6. The processing system of claim 1, the determination module comprising:
a plurality of demodulators for demodulating the plurality of interference signals;
a plurality of low pass filters for filtering the plurality of interference signals after demodulation; and
a plurality of analog to digital converters (ADC) to digitize the plurality of interference signals.

7. The processing system of claim 6, wherein the plurality of interference signals are digitized before demodulation and demodulation and filtering are performed digitally.

8. The processing system of claim 1, the determination module comprising:
a first wide bandwidth channel comprising:
a first analog to digital converter (ADC);
a switch bank coupling the plurality of interference signals to an input of the first ADC,
wherein the switch bank selects the subset of the plurality of interference signals in response to the subset of the plurality of distances exceeding a predetermined distance, and
wherein the output of the switch bank is a summing junction;
a first demodulator connected to the first ADC; and
a first low pass filter connected to first demodulator; and
a second wide bandwidth channel comprising:
a second ADC separate from the first ADC and coupled to the noisy active pen signal;
a second demodulator separate from the first demodulator and connected to the second ADC; and
a second low pass filter separate from the first low pass filter and connected to the second demodulator.

9. The processing system of claim 8, wherein the switch bank is configured as a multiplexer that selects only one of the plurality of interference signals, and wherein the summing junction is a wire.

10. The processing system of claim 1, the determination module comprising:
a single wide bandwidth channel comprising:
a difference amplifier with a first input coupled to the noise active pen signal; and
a plurality of variable resistors coupling the subset of the plurality of interference signals to a second input of the difference amplifier.

11. A method for reducing interference, comprising:
receiving a noisy active pen signal associated with an active pen from a panel receiver;
receiving a plurality of interference signals from a plurality of interference receivers;
determining a location of the active pen;
calculating a plurality of distances between the location and the plurality of interference receivers;
selecting, based on the plurality of distances, a subset of the plurality of interference signals from a subset of the plurality of interference receivers,
wherein the subset of the plurality of interference receivers are separated from the location by a subset of the plurality of distances;
determining an estimated interference signal based on the subset of the plurality of interference signals; and
generating a filtered active pen signal by reducing interference in the noisy active pen signal based on the estimated interference signal.

12. The method of claim 11, further comprising:
applying a plurality of weights to the subset of the plurality of interference signals based on subset of the plurality of distances,
wherein the estimated interference signal is further determined based on the plurality of weights.

13. The method of claim 11, further comprising:
demodulating the plurality of interference signals using a plurality of demodulators;

filtering the plurality of interference signals by applying a plurality of low pass filters to the subset of the plurality of interference signals after demodulation; and digitizing the plurality of interference signals using a plurality of analog to digital converters (ADC).

14. The method of claim 13, wherein digitizing the plurality of interference signals occurs before demodulating the plurality of interference signals.

15. The method of claim 11, wherein:
the subset of the plurality of interference signals are selected using a switch bank in response to the subset of distances exceeding a predetermined distance;
the switch bank couples the subset of the plurality of interference signals to an input of a first analog to digital converter (ADC); and
the noisy active pen signal is coupled to an input of a second ADC separate from the first ADC.

16. An input device, comprising:
a panel receiver;
a plurality of interference receivers; and
a processing system configured to:
receive a noisy active pen signal associated with an active pen from the panel receiver;
receive a plurality of interference signals from the plurality of interference receivers;
determine a location of the active pen;
calculate a plurality of distances between the location and the plurality of interference receivers;
select, based on the plurality of distances, a subset of the plurality of interference signals from a subset of the plurality of interference receivers,
wherein the subset of the plurality of interference receivers are separated from the location by a subset of the plurality of distances;
determine an estimated interference signal based on the subset of the plurality of interference signals; and
generate a filtered active pen signal by reducing interference in the noisy active pen signal based on the estimated interference signal.

17. The input device of claim 16, wherein the processing system is further configured to:
apply a plurality of weights to the subset of the plurality of interference signals based on the subset of the plurality of distances,
wherein the estimated interference signal is further determined based on the plurality of weights.

18. The input device of claim 16, the processing system comprises:
a plurality of demodulators for demodulating the plurality of interference signals;
a plurality of low pass filters for filtering the plurality of interference signals after demodulation; and
a plurality of analog to digital converters (ADC) to digitize the plurality of interference signals.

19. The input device of claim 16, wherein the processing system comprises:
a first wide bandwidth channel comprising:
a first analog to digital converter (ADC);
a switch bank coupling the plurality of interference signals to an input of the first ADC,
wherein the switch bank selects the subset of the plurality of interference signals in response to the subset of the plurality of distances exceeding a predetermined distance, and
wherein the output of the switch bank is a summing junction;
a first demodulator connected to the first ADC; and
a first low pass filter connected to first demodulator; and
a second wide bandwidth channel comprising:
a second ADC separate from the first ADC and coupled to the noisy active pen signal;
a second demodulator separate from the first demodulator and connected to the second ADC; and
a second low pass filter separate from the first low pass filter and connected to the second demodulator.

20. The input device of claim 16, wherein the processing system comprises:
a single wide bandwidth channel comprising:
a difference amplifier with a first input coupled to the noise active pen signal; and
a plurality of variable resistors coupling the subset of the plurality of interference signals to a second input of the difference amplifier.

* * * * *